(12) United States Patent
Madan et al.

(10) Patent No.: US 12,373,361 B2
(45) Date of Patent: Jul. 29, 2025

(54) SYSTEMS, METHODS, AND DEVICES FOR ADVANCED MEMORY TECHNOLOGY

(71) Applicant: Advanced Micro Devices, Inc., Santa Clara, CA (US)

(72) Inventors: Niti Madan, Bee Cave, TX (US); Gabriel H. Loh, Bellevue, WA (US); James R. Magro, Lakeway, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/239,531

(22) Filed: Aug. 29, 2023

(65) Prior Publication Data

US 2024/0078195 A1 Mar. 7, 2024

Related U.S. Application Data

(60) Provisional application No. 63/403,110, filed on Sep. 1, 2022, provisional application No. 63/403,104, filed on Sep. 1, 2022.

(51) Int. Cl.
G06F 12/00 (2006.01)
G06F 3/06 (2006.01)
G06F 13/16 (2006.01)

(52) U.S. Cl.
CPC ........ G06F 13/1642 (2013.01); G06F 3/0659 (2013.01); G06F 13/1636 (2013.01); G06F 13/1668 (2013.01)

(58) Field of Classification Search
None
See application file for complete search history.

(56) References Cited

U.S. PATENT DOCUMENTS

| | | | |
|---|---|---|---|
| 2006/0276604 A1* | 12/2006 | Earnest | C08F 214/18 526/255 |
| 2009/0103855 A1 | 4/2009 | Binkert et al. | |
| 2016/0124873 A1* | 5/2016 | Xu | G06F 12/023 711/167 |
| 2016/0217087 A1 | 7/2016 | Lim et al. | |
| 2016/0342363 A1* | 11/2016 | Krause | G06F 3/0683 |
| 2019/0268086 A1 | 8/2019 | Wuu et al. | |
| 2019/0279697 A1* | 9/2019 | Karpov | H10B 53/30 |
| 2019/0339866 A1 | 11/2019 | Mills et al. | |
| 2020/0004652 A1 | 1/2020 | Niu et al. | |
| 2021/0200433 A1 | 7/2021 | Xu et al. | |

OTHER PUBLICATIONS

International Search Report and Written Opinion for International Application No. PCT/US2023/031473, mailed Dec. 5, 2023, 8 pages.
ARM; "AMBA® AXI™ and ACE™ Protocol Specification"; ARM, 120 Rose Orchard Way, San Jose, CA 95134; 2011; 306 pages.

* cited by examiner

*Primary Examiner* — Daniel D Tsui
(74) *Attorney, Agent, or Firm* — Polansky & Associates, P.L.L.C.; Paul J. Polansky

(57) ABSTRACT

An electronic device includes a processor having processor circuitry and a leader memory controller, a controller coupled to the processor and having a follower memory controller, and a memory. The processor circuitry is operable to access the memory by issuing memory access requests to the leader memory controller. The leader memory controller is operable to complete the memory access requests using the follower memory controller to issue memory commands to the at least one memory die.

23 Claims, 8 Drawing Sheets

SYSTEMS, METHODS, AND DEVICES FOR ADVANCED MEMORY TECHNOLOGY

This application claims priority to U.S. Provisional Patent Application 63/403,104, filed Sep. 1, 2022, the entire contents of which are incorporated by reference herein.

BACKGROUND

This disclosure relates generally to data processing systems, and more specifically to data processing systems that are suitable for use with advanced memory technology. Typically, memory technology is developed and "optimized" as an independent macrocell (macro) or for specific applications like deep neural networking (DNN) in the high-bandwidth memory (HBM) case. Some advancements like graphics double data rate dynamic random access memory (GDDR) support higher bandwidth memory accesses for graphics applications compared to standard double data rate (DDR) memory. More fine-grained optimizations of memory technology with logic technology and architecture have not been deeply explored, but there is much to do to achieve better performance and lower power products. Non-linear power increase and decreasing improvement in performance and memory density from generation to generation require more design and co-optimization with memory controller development, and can also help to alleviate the memory bottleneck.

Figure 1:
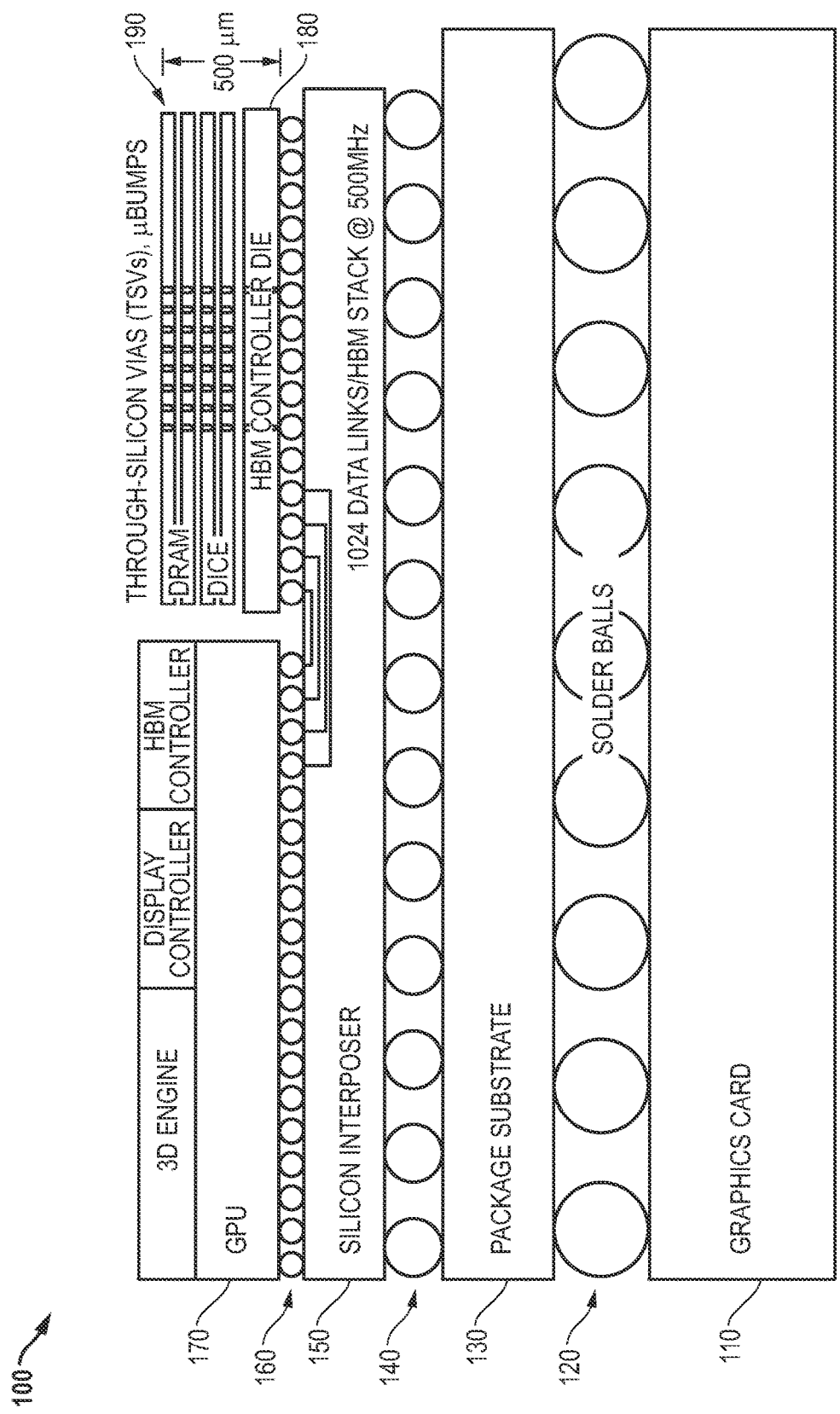
FIG. 1 illustrates a cross section of a multi-layer stacked graphics card known in the prior art.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well. The following Detailed Description is directed to electronic circuitry, and the description of a block shown in a drawing figure implies the implementation of the described function using suitable electronic circuitry, unless otherwise noted. As used herein, an electronic device means a physical apparatus or assembly of electronic circuits.

DETAILED DESCRIPTION OF ILLUSTRATIVE EMBODIMENTS

An electronic device includes a processor having processor circuitry and a leader memory controller, a controller coupled to the processor and having a follower memory controller, and a memory. The processor circuitry is operable to access the memory by issuing memory access requests to the leader memory controller. The leader memory controller is operable to complete the memory access requests using the follower memory controller to issue memory commands to the memory.

An electronic device includes a semiconductor die having a first major surface and a second major surface. The semiconductor device includes a processor region, a controller region, and a memory region. The processor region has a first side and a second side and includes a leader memory controller. The controller region has a first side adjacent to the second side of the processor region and a second side. The controller region includes a follower memory controller that is electrically coupled to the leader memory controller. The memory region has a first side adjacent to the second side of the controller region and a second side, wherein the memory region is electrically coupled to the controller region.

A method for operating an electronic device includes processing data and generating memory access requests in response thereto. An order of the memory access requests is scheduled using a leader memory controller. A sequence of the memory access requests is scheduled in the order to a follower memory controller. The sequence of memory access requests is issued to a memory by the follower memory controller.

FIG. 1 illustrates a cross section of a multi-layer stacked graphics device 100 known in the prior art. Multi-layer stacked graphics device 100 includes a graphics card 110, a set of solder balls 120, a package substrate 130, and set of solder balls 140, a silicon interposer 150, a set of microbumps 160, a graphics processing unit 170, a high bandwidth memory controller die 180, and a high bandwidth memory stack 190.

Graphics card 110 is a multi-layer printed circuit board (PCB) that includes internal routing layers (not shown in FIG. 1) that are chemically etched to form interconnects between signal lines. The signal lines are connected to other circuits in a top surface thereof using solder balls 120. Graphics card 110 forms the underlying substrate for the remainder of the circuitry used in multi-layer stacked graphics device 100.

Solder balls 120 are lead-free, low melting point metallic spheres on the top side of graphics card 110. They are typically picked and placed on the bottom of package substrate 130. When package substrate 130 is attached to graphics card 110 during manufacturing, solder balls 120 are typically heated and reflowed to form mechanical and electrical bonds between landing pads on graphics card 110 and corresponding terminals on the bottom of package substrate 130.

Package substrate 130 forms the underlying substrate for all integrated circuit dice used in multi-layer stacked graphics device 100.

Solder balls 140 are smaller than solder balls 120 and are typically picked and placed on the bottom of silicon interposer 150. They are typically formed with a lead-free, low melting-point intermetallic layer that can be heated and reflowed to bond the terminals on the bottom of silicon interposer 150 to package substrate 130. The melting point is low enough to melt and reflow solder balls 140 without damaging the integrated circuits.

Silicon interposer 150 is a routing layer that forms further mechanical support for graphics processing unit 170, high bandwidth memory controller die 180, and high bandwidth memory stack 190. It includes internal routing layers that allow graphics processing unit 170 to send and receive a large amount of data through relatively short and mainly lateral routes at high speed. In the example shown in FIG. 1, silicon interposer 150 includes 1024 data lines that conduct data at a speed of 500 mega-Hertz (MHz).

Microbumps 160 are small bumps that connect GPU 17 and high bandwidth memory controller die 180 to the top surface of silicon interposer 150. They too are typically formed with a low melting-point intermetallic layer that can be heated and reflowed to bond the terminals on the bottom of graphics processing unit 170 and high bandwidth memory controller die 180 to silicon interposer 150.

Graphics processing unit 170 is a complex, high-performance graphics processor that performs such tasks as color space conversion, geometric shape processing, vertex processing, shading, rendering, and rasterization using a single-instruction, multiple data (SIMD) architecture. It includes subblocks such as a three-dimensional rendering engine, a display controller, and a high bandwidth memory controller. As noted above, graphic processing unit 170 includes a set of microbumps on its bottom side for connection to the top surface of silicon interposer 150.

High bandwidth memory controller die 180 forms a memory controller for accessing memory in high bandwidth memory stack 190, as well as forming the physical base for high bandwidth memory stack 190. High bandwidth memory controller die 180 includes a set of microbumps on its bottom side for connection to the top surface of silicon interposer 150, and also has through-silicon vias (TSVs) to route signals from its bottom surface to circuitry formed on its top surface. High bandwidth memory controller die 180 operates with a set of memory dice operating according to the High Bandwidth Memory Standard, such as the High Bandwidth Memory DRAM (HBM3) Standard, JESD238 (January 2022), published by the Joint Electron Devices Engineering Council.

High bandwidth memory stack 190 includes a set of DRAM dice arranged in a vertical stack and interconnected using through-silicon vias (TSVs) to the top of high bandwidth memory controller die 180. In the example shown in FIG. 1, high bandwidth memory stack 190 includes a stack of four DRAM dice.

Advanced memory types, including non-volatile main memories such as ferro-electric RAMs (FeRAMs), magneto resistive RAMs (MRAMs), and volatile memories such as dynamic random access memories (DRAMs), including high bandwidth memory (HBM) and other stacked variants of DRAM, are being considered and traded-off for achieving higher memory density, performance, and lower power. DRAMs have been the most popular off-chip memory, however, even the current state-of-the-art double data rate, version five (DDR5) DRAM has certain performance-power-area (PPA) limitations related to having to access data off-chip. The typical DRAM bit cell consists of a one transistor, one capacitor (1T-1C) structure in which the capacitor is formed by a dielectric layer sandwiched in between conductor plates. System inter-process communications (IPC) is often limited by DRAM bandwidth and latency, especially in memory-heavy workloads. Ferro-electric random access memory is like 1T-1C DRAM, except that the capacitor is made of a ferroelectric material versus a (linear) dielectric in the DRAM case. Bit states '0' and '1' are written with electric polarization orientations of the ferroelectric material in the dielectric. The benefit of FeRAM technology is refresh-free storage and the potential of offering more density and performance over DRAM. Magneto-resistive random access memory, on the other hand, uses a one-transistor, one-resistor (1T-1R) bit cell, and it does not have a destructive read, unlike DRAM and FeRAM. However, MRAM is less reliable compared to FeRAM and has lower endurance and shorter retention.

HBM was introduced to provide increased bandwidth and memory density, allowing up to 8-12 layers of DRAM dies to be stacked on top of each other with an optional logic/memory interface die, in this case, high bandwidth memory controller die 180. This memory stack can either be connected to graphics processing unit 170 through silicon interposers as shown in FIG. 1, or placed on top of graphics processing unit 170 itself to provide superior connectivity and performance. Industry has been striving to optimize the performance, power, and memory density/area of the memory block, especially when used with emerging memory such as high bandwidth memory.

The present disclosure is directed to enhancing systems with advanced memories by, advanced memory controller design. An exemplary memory includes a DRAM such as high bandwidth memory stack 190 as shown in FIG. 1. The memory may be stacked on top of a compute chip (which could be a central processing unit (CPU), graphics processing unit (GPU), field-programmable gate array (FPGA), or any other type of accelerator), with a memory interface controller die, in this case, high bandwidth memory controller die 180.

Figure 2:
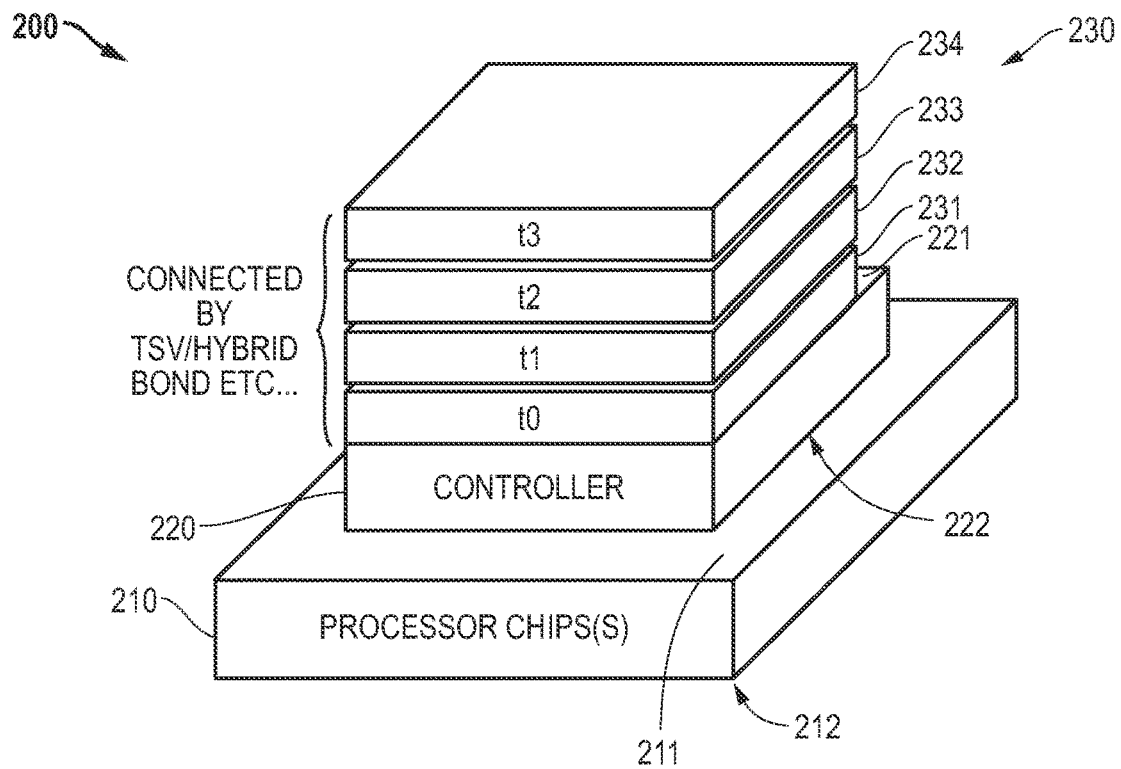
FIG. 2 illustrates a perspective view of an electronic device according to some embodiments.

FIG. 2 illustrates a perspective view of an electronic device 200 according to some embodiments. Electronic device 200 is a multi-layer stacked electronic device that includes processor chip(s) 210, a controller 220, and a memory stack 230. Processor chip(s) 210 include one or more processor chips that form a base of electronic device 200, and in the example shown in FIG. 2, processor chip(s) 210 include a single processor chip having first major surface 211 toward the top and a second major surface 212 toward the bottom as electronic device 200 is oriented in FIG. 1.

Controller 220 forms a base of a hybrid memory cube and has a first major surface 221 and a second major surface 222. Second major surface 222 is electrically and mechanically connected to first major surface 211 of the processor chip(s) 210.

Memory stack 230 includes a memory die 231, a memory die 232, a memory die 233, and a memory die 234 that are mounted successively on top of one another and interconnected using through-silicon vias (TSVs) with hybrid bonding, and are labelled "t0", "t1", "t2", and "t3", respectively. Memory die 231 is on the bottom of memory stack 230 and has a bottom surface connected to the top surface of controller 220. Memory die 232 is above memory die 231 and has a bottom surface connected to the top surface of memory die 231, and a top surface. Memory die 233 is above memory die 232 and has a bottom surface connected to the top surface of memory die 232, and a top surface. Memory die 234 is above memory die 233 and has a bottom surface connected to the top surface of memory die 233, and a top surface.

Electronic device 200 is suitable for use with an enhanced memory controller design that will be discussed further below.

Figure 3:
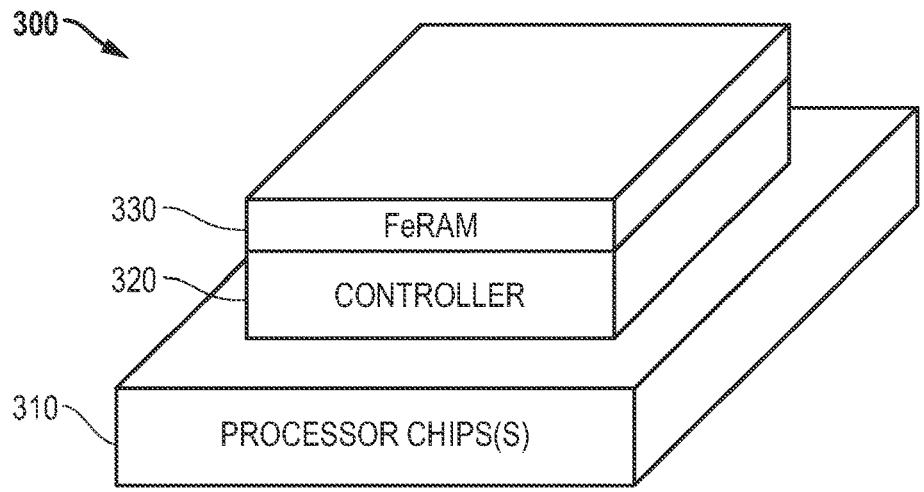
FIG. 3 illustrates a perspective view of another electronic device according to some embodiments.

FIG. 3 illustrates a perspective view of another electronic device 300 according to some embodiments. Electronic device 300 is a multi-layer stacked electronic device that includes processor chip(s) 310, a controller 320, and a ferro-electric random access memory 330 labelled "FeRAM". Processor chip(s) 310 form a base of electronic device 300, and in the example shown in FIG. 3, processor chip(s) 310 includes a single processor die having a first major surface at the top and a second major surface at the bottom as electronic device 300 is oriented in FIG. 3.

Controller 320 has a first major surface at the top and a second major surface at the bottom as electronic device 300 is oriented in FIG. 3, in which the second major surface is electrically and mechanically connected to the first major surface of processor chip(s) 310.

Ferro-electric random access memory 330 has a first major surface at the top and a second major surface at the bottom as electronic device 300 is oriented in FIG. 3, in which the second major surface is electrically and mechanically connected to the first major surface of controller 320.

Electronic device 300 is suitable for use with an enhanced memory controller design that will be discussed further below.

Figure 4:
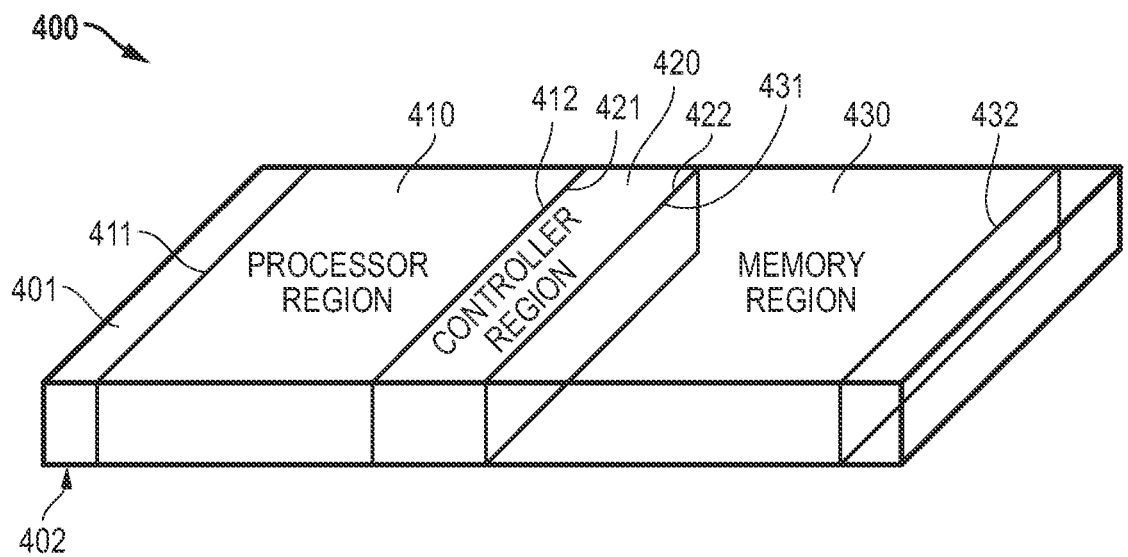
FIG. 4 illustrates a perspective view of yet another electronic device according to some embodiments.

FIG. 4 illustrates a perspective view of yet another electronic device 400 according to some embodiments. Electronic device 400 is a single-layer electronic device implemented with a monolithic semiconductor die having a first major surface 401 at the top and a second major surface 402 at the bottom as electronic device 400 is oriented in FIG. 4. Electronic device 400 includes generally a processor region 410, a controller region 420, and a memory region 430. Processor region 410 has a first side 411 on the left and a second side on the right as the monolithic semiconductor die is oriented in FIG. 1. Controller region 420 has a first side 421 adjacent to second side 412 of processor region 410 and a second side 422. Memory region 430 has a first side 431 adjacent to second side 422 of controller region 420 and a second side 432, wherein memory region 430 is electrically coupled to controller region 420. These regions are adjacent by either being nearby each other, or as shown in FIG. 4, having common borders that may not be fully coextensive with each other. Moreover, the regions need not be rectilinear as shown in FIG. 4.

In electronic device 400, memory region 430 is implemented with a logic process compatible ferro-electric random access memory, allowing all regions to be implemented on a single semiconductor chip made with, for example, a deep sub-micron complementary metal-oxide-semiconductor (CMOS) process.

Electronic device 400 is suitable for use with an enhanced memory controller design that will be discussed further below.

Figure 5:
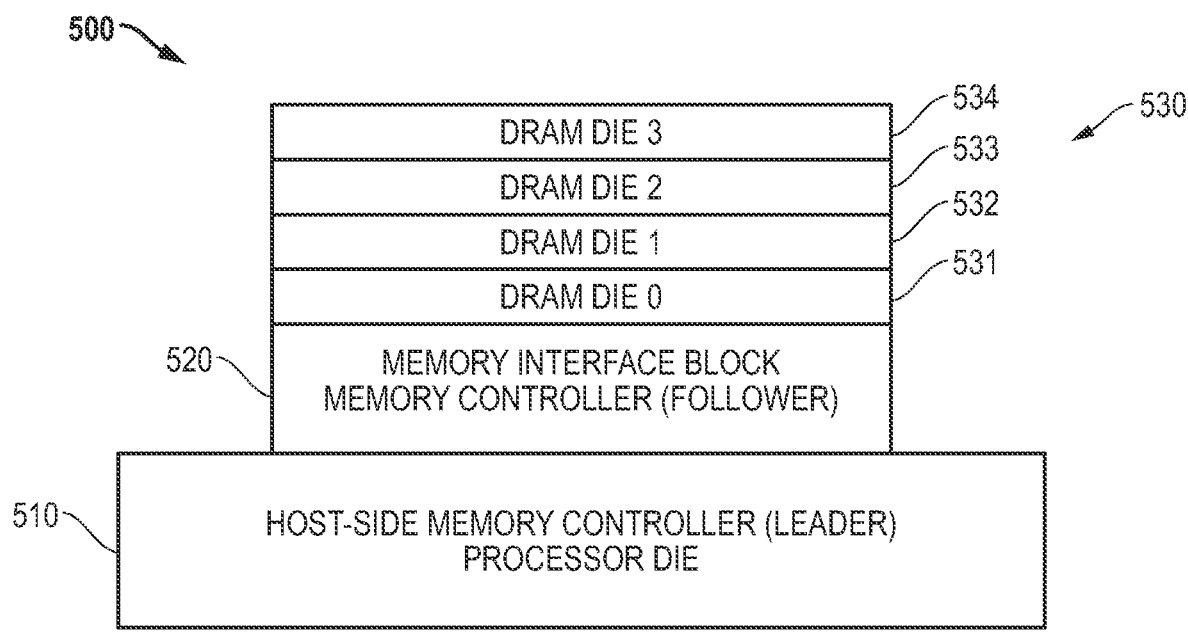
FIG. 5 illustrates a cross section of still another electronic device according to some embodiments.

FIG. 5 illustrates a cross section of still another electronic device 500 according to some embodiments. Electronic device 500 is a multi-layer stacked electronic device that includes a processor die 510, a controller die 520, and a memory 530 having at least one memory die.

Processor die 510 forms a base of electronic device 500, and as shown in FIG. 5, processor die 510 includes a host-side memory controller, also known as a "leader" memory controller, as well as normal processor circuitry that can include, for example, various processor circuits such as central processing unit (CPU) cores, graphics processing unit (GPU) cores, caches, and a data fabric.

Controller die 520 is connected to processor die 510, e.g., the bottom major surface of controller die 520 is connected to the top major surface of processor die 510 using vertical interconnect technology that that includes through-silicon vias (TSVs) and micro-bumping, as described above. Controller die 520 includes a memory-side memory controller, known as a "follower" memory controller.

In the example shown in FIG. 5, memory 530 includes four memory dice including a memory die 531, a memory die 532, a memory die 533, and a memory die 534, labelled "DRAM DIE 0", "DRAM DIE 1", "DRAM DIE 2", and "DRAM DIE 3", respectively. Memory die 531 is on the bottom of the stack and has a bottom surface connected to the top surface of controller die 520. Memory die 532 is above memory die 531 and has a bottom surface connected to the top surface of memory die 531, and a top surface. Memory die 533 is above memory die 532 and has a bottom surface connected to the top surface of memory die 532, and a top surface. Memory die 534 is above memory die 533 and has a bottom surface connected to the top surface of memory die 533, and a top surface.

In electronic device 500, the processor circuitry in processor die 510 is operable to access memory 530 by issuing memory access requests to the leader memory controller, and the leader memory controller is operable to complete the memory access requests using the follower memory controller in controller die 520 by causing the follower memory controller to issue memory commands to memory 530.

As will become apparent, the division of the function of the memory controller into two parts, a leader memory controller and a follower memory controller, provides certain advantages. First, it allows the leader memory controller to issue memory access commands without knowing the type of memory being used or all of its specific timing requirements. Thus, the leader memory controller can be re-used for different types of memory with different access parameters. Second, the follower memory controller can respond to the memory access requests by issuing specific memory commands the memory without having to determine certain information that was useful to the leader memory controller in re-ordering the memory access commands in the first queue, such as the page status of the memory page accessed by pending memory access commands. The new memory controller architecture is useful in fully harnessing the bandwidth enabled by various emerging memory technologies, such as 3D stacked DRAM. It is co-optimized with the packaging technology for better memory- and logic-stacking.

Thus, an electronic device includes a hierarchical or decoupled memory controller architecture. According to some embodiments, the system uses the hierarchical design for memory controllers in which the host-side memory controller (referred to as the leader) controls the order of requests to DRAM banks and the memory-side memory controller (referred to as the follower) residing in the interface block or controller die follows the order and issues the DRAM commands accordingly. This optimization assumes that both host- and memory-side controllers are implemented separately, such as on two different dice or die stacks. This assumption allows for decoupling between the host-side IP as it has greater control over the memory scheduling policy decisions based on type of request, host-side priority, and quality-of-service requirements which the memory vendor is not expected to be aware of. According to some embodiments, the follower memory controller issues the received memory access commands in the order received, thus guaranteeing the order of the requests issued by leader memory controller. In some embodiments, the decoupled nature of the leader memory controller and the follower memory controller allow them to be optically connected through high-speed optical links.

Figure 6:
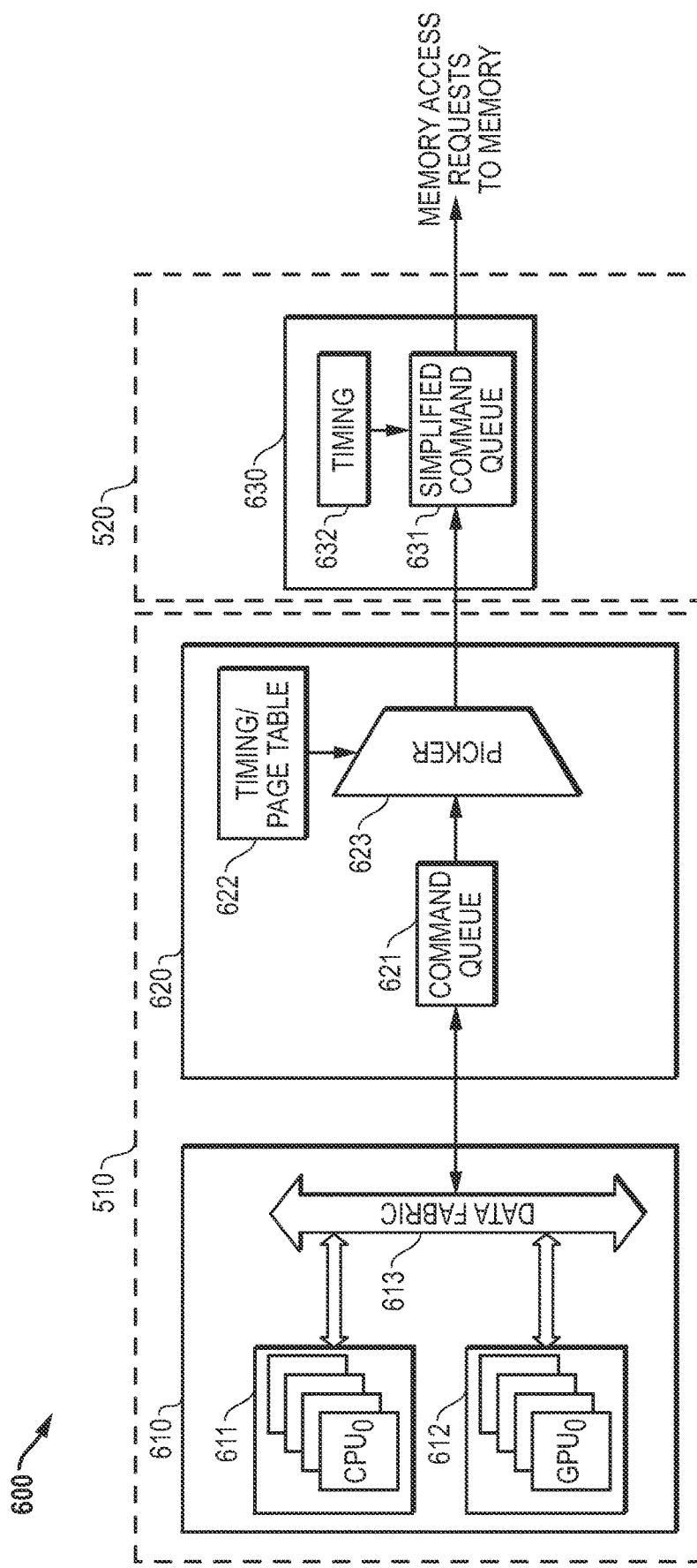
FIG. 6 illustrates in block diagram form a data processing system having a hierarchical memory controller that can be used in any of the electronic devices of FIGS. 2-5 according to some embodiments.

FIG. 6 illustrates in block diagram form a data processing system 600 having a hierarchical memory controller that can be used in any of the electronic devices of FIGS. 2-5 according to some embodiments. Data processing system 600 includes generally processor die 510 and controller die 520 as shown previously in FIG. 5, but with additional details.

Processor die 510 includes processor circuitry 610 and a leader memory controller 620. Processor circuitry 610 has a bidirectional downstream port, in which "downstream" means in a direction toward memory. Leader memory controller 620 has a bidirectional upstream port connected to the bidirectional downstream port of processor circuitry 610, and a bidirectional downstream power. Follower memory controller 630 has an upstream bidirectional port connected to the bidirectional downstream port of leader memory controller 620, and a bidirectional downstream port for providing memory access requests to the memory die or memory dice in the system. In some embodiments, leader memory controller 620 and follower memory controller 630 are bidirectionally connected optically, i.e., by an optical link.

Processor circuitry 610 includes a central processing unit core complex 611, a graphics processing unit core complex 612, and a data fabric 613. Central processing unit core complex 611 includes multiple CPU cores such as the four exemplary CPU cores shown in central processing unit core complex 611. In a typical implementation, each CPU core has its own cache hierarchy, and the CPUs share a common last-level cache (LLC), not shown in FIG. 6. Similarly, graphics processing unit core complex 612 includes multiple GPU cores such as the four exemplary GPU cores shown in graphics processing unit core complex 612. In a typical implementation, each GPU core has its own cache hierarchy as well. Alternatively, the GPU cores in graphics processing unit core complex 612 can be replaced with a very wide single instruction, multiple data (SIMD) set of cores that operate in a massively parallel fashion. The CPU and GPU cores provide memory access requests to the hierarchical memory controller using data fabric 613, which includes a large crossbar switch as well as buffers and circuits to ensure cache coherence.

The hierarchical memory controller includes a leader memory controller 620 on processor die 510, and a follower memory controller 630 on controller die 520. Leader memory controller 620 includes a command queue 621, a timing block/page table 622, and a picker 623. Upon receiving memory access requests, leader memory controller 620 first decodes the memory access requests and converts the addresses to addresses implemented in the memory system. It then stores them in command queue 621. Command queue 621 contains entries for each memory access request while it remains pending, as well as a large associative memory that is content-addressable to be able to associate accesses by type, age, quality of service, etc. for efficient picking. Because each entry requires a large amount of circuit area for the content addressable memory, command queue 621 is large.

In order for a memory access to be selected by picker 623, it has to be timing eligible, so DRAM timing block/page table 622 has an array of timers that keep track of elapsed time between certain events. In addition, picker 623 uses timing block/page table 622 to pick accesses preferentially to open pages, while occasionally scheduling accesses to closed pages to hide the overhead of these accesses and/or to ensure those accesses to make progress to completion. Picker 623 attempts to schedule accesses preferentially by type, e.g., read or write, in order to manage and potentially hide overhead and turn-around times when switching between read and write accesses, and between write and read accesses. Leader memory controller 620 sends the page status with the request so that follower memory controller 630 knows whether or not to issue precharge and activate commands before a memory access command to a closed page.

Leader memory controller 620 includes other blocks not specifically shown in FIG. 6 that determine the proper timing of events including refreshes, that manage power down and power up events, and that perform periodic memory retraining and the like. These are not specifically shown in FIG. 6, but their functions are generally well known and are not described further here.

Follower memory controller 630 includes a command queue 631 and a DRAM timing block 632. Command queue 631 is a simplified DRAM command queue that allows memory commands to be buffered, and issues them in the order they were received and stored in command queue 631. When they become the oldest pending commands, they are scheduled when they become ready for issuance as determined by a smaller set of timing criteria in DRAM timing block 632. Because it does not allow out-of-order accesses, command queue 631 does not need content-addressable memory to search for commands that of the same type as present commands (read or write) or are otherwise ready to be issued, but instead only needs to determine if the oldest command is ready to be issued.

Once follower memory controller 630 issues actual DRAM commands, it sends a command completion message back to the leader memory controller. This protocol ensures that the command queues in the memory controllers are synchronized and consistent with each other. In some embodiments, the host-side leader memory controller can be implemented as more of an application-level scheduler because the host has the intelligence to infer the properties of the application, allowing the memory-side controller to remain focused on DRAM-specific optimizations.

The division of functions between the leader memory controller and the follower memory controller eliminates the need for the follower memory controller to track each request's page status, and thus makes it light weight. Row commands can be scheduled by the follower memory controller based on the received page status. Similarly, picker logic will only be present in the leader memory controller. Thus, complex scheduling considerations such as quality-of-service, streak management, and maximum latency considerations can be offloaded from the follower memory controller, making it a simpler and lighter weight memory controller.

By separating the functions of the leader memory controller and the follower memory controller, the data processing devices allow more efficient designs with smaller follower memory controllers without associative memory in near-memory circuitry such as controllers and processors-in-memory. The leader memory controller can also abstract the memory access without knowing certain specifics of the memory technology.

In some embodiments, follower memory controller 630 can be given more autonomy in scheduling memory access requests. In these examples, leader memory controller 620 would also provide request priority or quality-of-service (QoS) metadata to follower memory controller 630. These embodiments allow the host to have control over application level prioritization and type of scheduling policy and achieve end-to-end quality of service goals. The request priority/QoS can be set based on the type of host, e.g., CPU or GPU, or the request priority/QoS can be set be set by the application. In either case, follower memory controller 630 responds to the provided request priority/QoS by scheduling requests with higher priorities preferentially to those with lower priorities. For example, the highest priority requests may automatically be processed before any lower priority requests. To implement this option, the amount of extra metadata required for command queue 631 would be small, e.g., only 4 extra bits per entry, and the logic to extract and compare highest-priority requests would be small. For example, follower memory controller 630 could follow the policy that all memory access requests with the highest QoS value would pass any memory access requests with lower QoS values.

Figure 7:
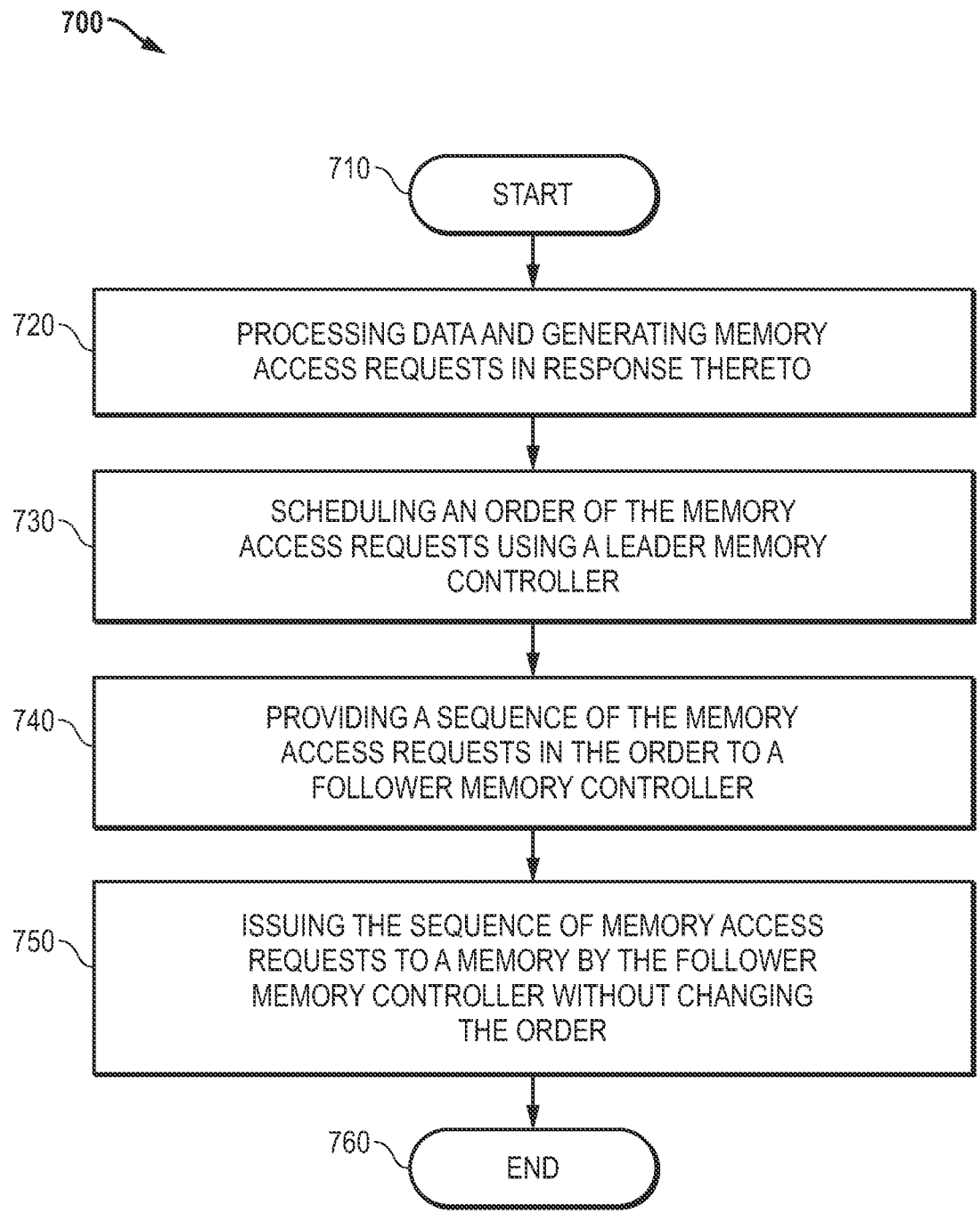
FIG. 7 illustrates a flow chart of a flow of operation of the data processing system of FIG. 6 according to some embodiments.

FIG. 7 illustrates a flow chart of a flow 700 of the operations of data processing system 600 of FIG. 6 according to some embodiments. Flow 700 starts in an action box 710.

An action box 720 includes processing data and generating memory access requests in response thereto. For example, a CPU core or a GPU core will generate memory access requests based on the program flow and send them to the leader memory controller for scheduling.

An action box 730 includes scheduling an order of the memory access requests using a leader memory controller. For example, accesses to DRAM locations in open memory pages are more efficient than accesses to DRAM locations in closed memory pages. Similarly, it is more efficient to continue a streak of accesses or a given type (read or write) than to switch to the opposite type (write or read). DRAM arbiters have a set of scheduling rules that determine when to continue a streak to maintain efficiency, and when to end a streak and start a streak of opposite-type accesses to ensure fairness. These scheduling rules require the memory controller to maintain tables to keep track of which pages are open in any DRAM bank in the system, and a set of timers to determine which commands can issue because all required timing parameters have been met. They also ensure that accesses with higher quality of service (QoS) values are issued preferentially to those with lower QoS values. These circuits are large, but according to the present disclosure, they are kept only in the leader memory controller.

An action box 740 includes providing a sequence of the memory access requests in the order to the follower memory controller. In this way, all complex scheduling decisions are made on the host side and the data processing system does not require the follower memory controller to make these determinations.

An action box 750 includes issuing the sequence of memory access requests to the memory by the follower memory controller without changing the order. Thus, the follower memory controller need not maintain a fully associative command queue, but can merely save the memory requests in a simple queue from which they are issued in order.

Flow 700 ends in an action box 760.

A memory controller according to the embodiments described herein provides a scalable memory controller architecture that enables efficient command bus sharing between multiple sub/pseudo-channels to improve overall memory bandwidth. 1113M allows sharing of a single command bus between two pseudo-channels, but has a dedicated data bus per pseudo-channel. A three-dimensional (3D) stacked memory will enable many more sub- or pseudo-channels than has yet been feasible with existing HBM standards. According to various embodiments, the follower memory controller will have dedicated memory controllers per pseudo- or sub-channel which will share the command bus efficiently.

Figure 8:
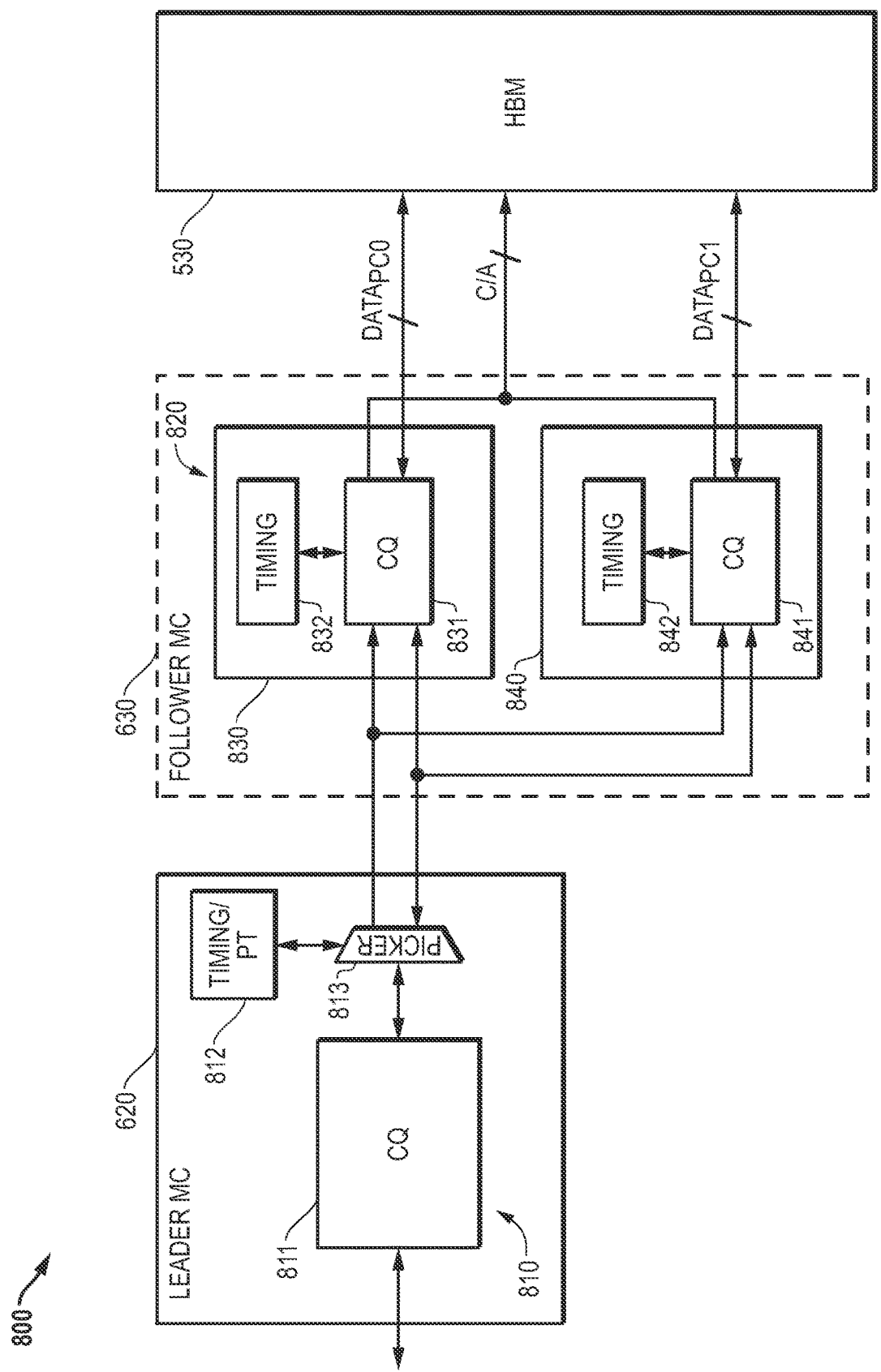
FIG. 8 illustrates in block diagram form a data processing system having a hierarchical memory controller according to some embodiments.

FIG. 8 illustrates in block diagram form a data processing system 800 having a hierarchical memory controller according to some embodiments. Data processing system 800 is useful in memory systems with pseudo-channels such as HBM and includes generally a leader memory controller 810, a follower memory controller 820, and a memory 530 such as an HBM as shown. Leader memory controller 810 has a bidirectional upstream port connected to processor circuitry, not shown in FIG. 8, a downstream output port, and a downstream bidirectional port. Follower memory controller 820 includes a follower memory controller 830 for a first pseudo-channel labelled "PC0" and a follower memory controller 840 for a second pseudo-channel labelled "PC1". Follower memory controller 830 has an upstream input port connected to the downstream output port of leader memory controller 810, an upstream bidirectional port connected to the downstream bidirectional port of leader memory controller 810, a downstream output port for providing memory access requests to memory 850 over a command and address bus labelled "C/A", and a downstream bidirectional port for conducting data for PC0 with memory 850 over a bus labelled "$DATA_{PC0}$". Follower memory controller 840 has an upstream input port connected to the downstream output port of leader memory controller 810, an upstream bidirectional port connected to the downstream bidirectional port of leader memory controller 810, a downstream output port for providing memory access requests to memory 850 over the C/A bus, and a downstream bidirectional port for conducting data for PC1 with memory 850 over a bus labelled "$DATA_{PC1}$".

Leader memory controller 810 is constructed similarly to leader memory controller 620 of FIG. 6, and has a command queue 811 corresponding to command queue 621, a DRAM timing block/DRAM page table block 812 corresponding to timing block/page table 622, and a picker 813 corresponding to picker 623, except that the downstream command and bidirectional data bus are separately shown for picker 813. Follower memory controller 830 is constructed similarly to follower memory controller 630 of FIG. 6, in which command queue 831 corresponds to command queue 631 and DRAM timing block 832 corresponds to DRAM timing block 632, except that the downstream command and address bus connected to the C/A bus and the bidirectional data bus $DATA_{PC0}$ are specifically shown. Likewise, follower memory controller 840 is constructed similarly to follower memory controller 630 of FIG. 6, in which command queue 841 corresponds to command queue 631, and DRAM timing block 842 corresponds to DRAM timing block 632, except that the downstream command and address bus connected to the C/A bus and the bidirectional data bus $DATA_{PC1}$ are specifically shown.

High bandwidth memory 850 has two pseudo channels, PC0 and PC1, that share a command bus but conduct separate data using separate data buses. In other embodiments, other types of memory that support multiple sub-channels or multiple pseudo-channels can be used instead of HBM. Data processing system 800 is scalable for future memory designs that may have more than two pseudo-channels.

One further approach to efficient scaling is to split the command buses that may be shared between many memory controllers into buses based on type of commands such as row and column commands. According to some embodiments, the memory controller hierarchy described herein will have a dedicated bus per command type. In one example, e dedicated buses include a row command bus and a column command bus. In another example, the dedicated buses include a precharge bus, an activate bus, and a read/write command bus.

Figure 9:
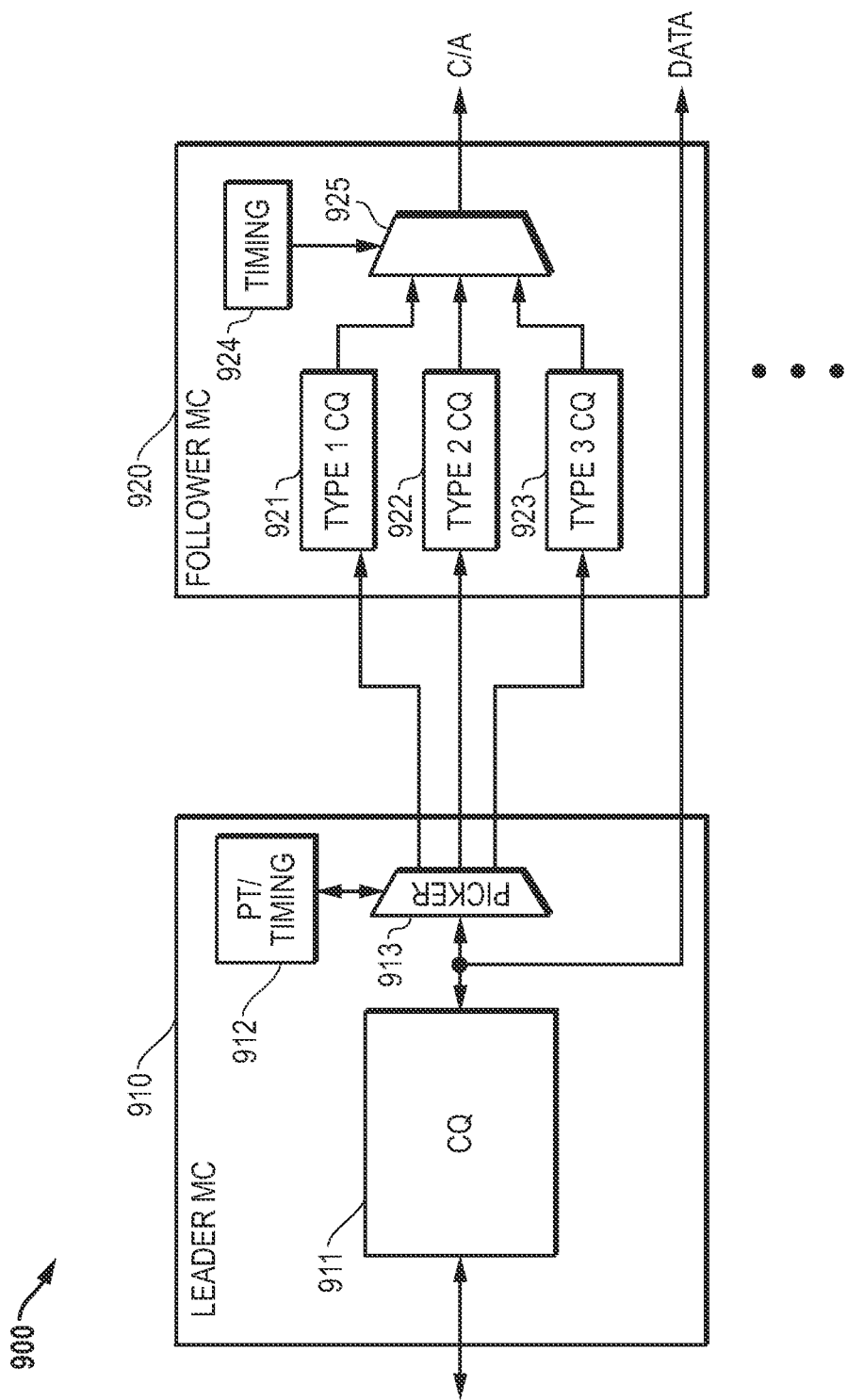
FIG. 9 illustrates in block diagram form a data processing system having a scalable memory controller according to some embodiments.

FIG. 9 illustrates in block diagram form a data processing system 900 having a scalable memory controller according to some embodiments. Data processing system 900 includes generally a leader memory controller 910 and a follower memory controller 920. Leader memory controller 910 has a bidirectional upstream port connected to processor circuitry, not shown in FIG. 9, two downstream output ports and an optional third downstream output port, and a bidirectional downstream data port. Follower memory controller 920 has a first upstream input port connected to a first downstream output port of leader memory controller 910, a second upstream input port connected to the second downstream output port of leader memory controller 910, an optional third upstream input port connected to the optional third downstream output port of leader memory controller 910, a downstream output port for providing memory access requests to a memory (not shown in FIG. 9), and a downstream bidirectional port for conducting data with the memory.

Leader memory controller 910 is constructed similarly to leader memory controller 620 of FIG. 6, and has a command queue 911 corresponding to command queue 621, a DRAM timing block/DRAM page table block 912 corresponding to timing block/page table 622, and a picker 913 similar to picker 623, except that the downstream bidirectional port is specifically shown for leader memory controller 910 and includes multiple downstream output ports for outputting different types of commands. In one example, the multiple downstream output ports include two downstream output ports in which one downstream output port conducts row (precharge and activate) commands and the other downstream output port conducts column (read and write) commands. In another example, the multiple downstream output ports include three downstream output ports in which a first downstream output port conducts precharge commands, a second output port conducts activate commands, and a third output port conducts read and write commands.

Follower memory controller 920 includes a command queue 921, a command queue 922, an optional command queue 923, a timing block 924, and a simplified picker 925. Command queue 921 has an input connected to the first downstream output port of leader memory controller 910, and an output. Command queue 922 has an input connected to the second downstream output port of leader memory controller 910, and an output. Optional command queue 923 has an input connected to the third downstream output port of leader memory controller 910, and an output. Timing block 924 has a bidirectional control port. Simplified picker 925 has a first input port connected to the output of command queue 921, a second input port connected to the output of command queue 922, an optional third input connected to the output of optional command queue 923, a control port connected to the control port of timing block 924, and an output forming the output of follower memory controller 920 and connected to the C/A bus.

The architecture of the hierarchical memory controller formed by leader memory controller 910 and follower memory controller 920 allows follower memory controller 920 to have more autonomy in scheduling, but requires the addition of a small picker and a slightly more complicated timing block 924. The architecture is highly scalable, allowing further such follower memory controllers to be connected to interface with larger memory systems.

Figure 10:
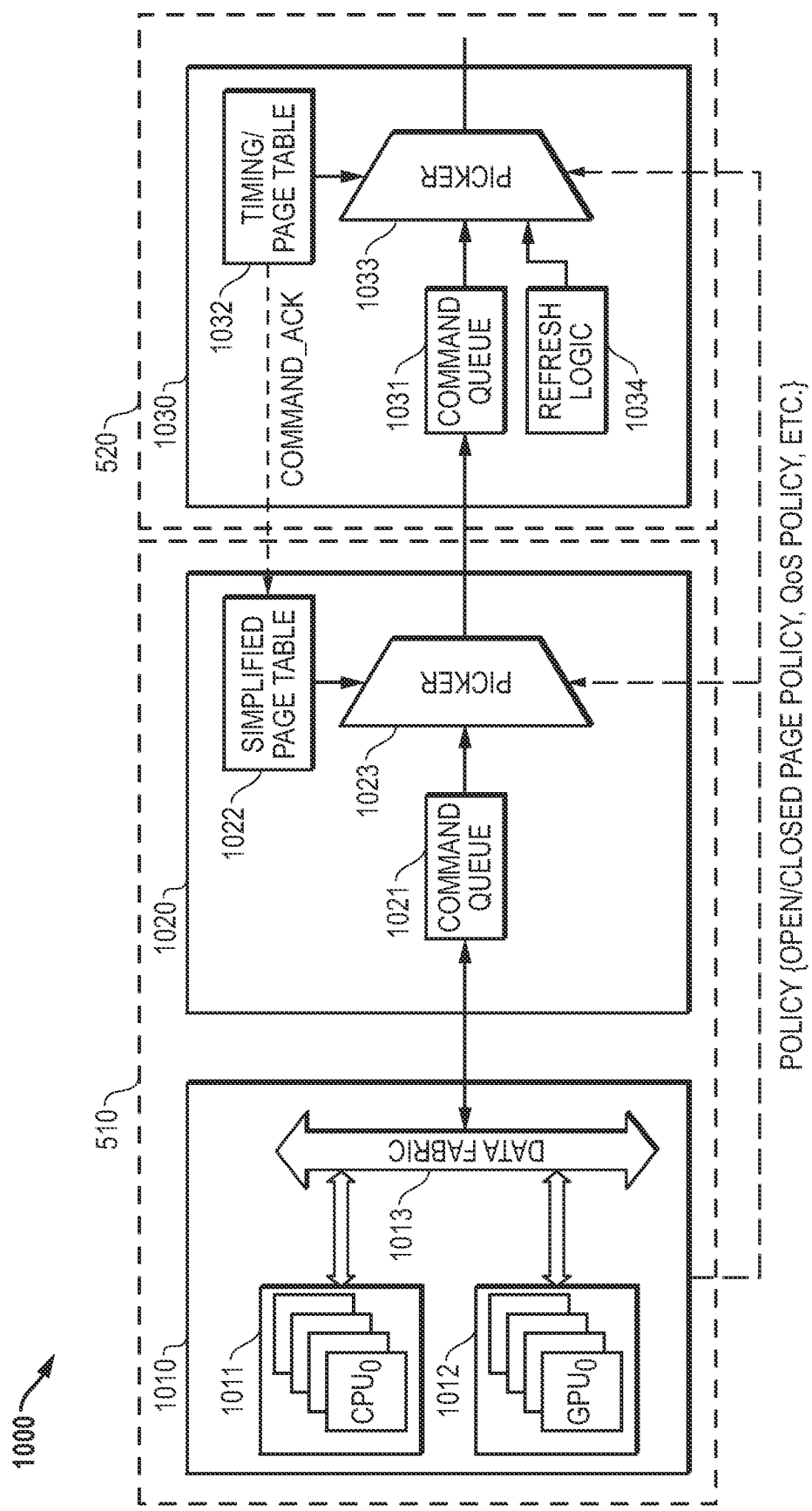
FIG. 10 illustrates in block diagram form a data processing system having a hierarchical and programmable memory controller according to some further embodiments.

FIG. 10 illustrates in block diagram form a data processing system 1000 having a hierarchical and programmable memory controller according to some further embodiments. Data processing system 1000 can also be used in any of the electronic devices of FIGS. 2-5. Data processing system 1000 includes generally processor die 510 and controller die 520 as shown previously in FIG. 5, but with additional details.

Processor die 510 includes processor circuitry 1010 and a leader memory controller 1020. Processor circuitry 1010 has a bidirectional downstream port, in which "downstream" means in a direction toward memory. Leader memory controller 1020 has a bidirectional upstream port connected to the bidirectional downstream port of processor circuitry 1010, and a bidirectional downstream port. Follower memory controller 1030 has an upstream bidirectional port connected to the bidirectional downstream port of leader memory controller 1020, and a bidirectional downstream port for providing memory access requests to the memory die or memory dice in the system. In some embodiments, leader memory controller 1020 and follower memory controller 1030 are bidirectionally connected optically, i.e., by an optical link.

Processor circuitry 1010 includes a central processing unit core complex 1011, a graphics processing unit core complex 1012, and a data fabric 1013. Central processing unit core complex 1011 includes multiple CPU cores such as the four exemplary CPU cores shown in central processing unit core complex 1011. In a typical implementation, each CPU core has its own cache hierarchy, and the CPUs share a common last-level cache (LLC), not shown in FIG. 10. Similarly, graphics processing unit core complex 1012 includes multiple GPU cores such as the four exemplary GPU cores shown in graphics processing unit core complex 1012. In a typical implementation, each GPU core has its own cache hierarchy as well. Alternatively, the GPU cores in graphics processing unit core complex 1012 can be replaced with a very wide single instruction, multiple data (SIMD) set of cores that operate in a massively parallel fashion. The CPU and GPU cores provide memory access requests to the hierarchical memory controller using data fabric 1013, which includes a large crossbar switch as well as buffers and circuits to ensure cache coherence.

The hierarchical memory controller includes a leader memory controller 1020 on processor die 510, and a follower memory controller 1030 on controller die 520. Leader memory controller 1020 includes a command queue 1021, a simplified page table 1022, and a picker 1023. Upon receiving memory access requests, leader memory controller 1020 first decodes the memory access requests and converts the addresses to addresses implemented in the memory system. It then stores them in command queue 1021. Command queue 1021 contains entries for each memory access request while it remains pending, as well as an associative memory that is content-addressable.

In order for a memory access to be selected by picker 1023, it has to be eligible. Simplified page table 1022 keeps track of the page status of each page in each bank of the memory system, whether open or closed and if open, the address of the page that is open. Picker 1023 uses simplified page table 1022 to pick accesses preferentially to open pages, while occasionally scheduling accesses to closed pages to hide the overhead of these accesses and/or to ensure those accesses to make progress to completion. Picker 1023 attempts to schedule accesses preferentially by type, e.g., read or write, in order to manage and potentially hide overhead and turn-around times when switching between read and write accesses, and between write and read accesses.

Leader memory controller 1020 includes other blocks not specifically shown in FIG. 10 that determine the proper timing of events including refreshes, that manage power down and power up events, the perform periodic memory retraining, and the like. These are not specifically shown in FIG. 10, but their functions are generally well known and are not described further here.

Follower memory controller 1030 includes a command queue 1031, a timing/page table block 1032, a picker 1033, and a refresh logic circuit 1034. Command queue 1031 is a DRAM command queue that allows memory commands to be buffered and scheduled out-of-order to achieve memory bus efficiency along with fairness for other accesses. Picker 1033 observes certain policies, such as timing eligibility and a preference for page hit commands over page miss commands, to determine the order in which it issues memory commands stored in command queue 1031 to main memory.

Data processing system 1000 provides two features that are useful in systems with distributed memory controllers. First, data processing system 1000 uses a follower memory controller 1030 that includes a page table. Including a page table in follower memory controller 1030 allows follower memory controller 1030 to have more control over the refresh mechanism to control thermal management of the memory. Because the refresh rate required to maintain DRAM memory cell contents varies with temperature, follower memory controller 1030 can provide better control of refresh timing based on DRAM temperature. For example, above a certain temperature, the refresh interval must increase to offset the increased leakage from DRAM capacitors. Advantageously, follower memory controller 1030 also includes refresh logic circuit 1034 and can increase the refresh rate of attached DRAM based on measured temperature. Moreover, follower memory controller 1030 has a timing/page table block 1032 and picker 1033 picks between memory access requests and refresh requests based on the required refresh rate and the refresh interval. Because follower memory controller 1030 can change the order of memory accesses, not only does it maintain a page table and timing eligibility counters, it also has a mechanism to synchronize its page table with simplified page table 1022 in leader memory controller 1020.

Once follower memory controller 630 issues actual DRAM commands, it sends a command completion message back to the leader memory controller. As shown in FIG. 10, this mechanism uses a sideband channel that sends a command acknowledgment labelled "COMMAND_ACK" to simplified page table 1022, but other types of signalling to maintain synchronization between pages tables are also possible. This protocol ensures that the command queues in each memory controller are in synchronization. In some embodiments, the host-side leader memory controller can be implemented as more of an application-level scheduler because the host has the intelligence to infer the properties of the application, allowing the memory-side controller to remain focused on DRAM-specific optimizations.

Second, data processing system 1000 provides a programmable memory controller capability within a memory controller hierarchy by determining one or more memory policy attributes and sending the policy attribute, using a signal labelled "POLICY", to an input of picker 1023 and/or an input of picker 1033. In one example, the policy attribute determines whether the affected memory controller should use an open or closed page policy. In another example, the policy attribute determines whether the affected memory controller will observe a quality-of-service ("QoS") attribute, in which use of the quality-of-service attribute allows lower memory access latency at the expense of lower overall efficiency, or raises memory access latency to achieve higher overall efficiency. In this way, processor circuitry 1010 is operable to provide the POLICY attribute based on a host-level application characteristic. The POLICY attribute can be provided to the affected memory controller in a variety of ways, for example, by an explicit sideband signal as shown in FIG. 10, or on a more granular basis by processor circuitry 1010 sending an in-band command or a hint. In response, the affected memory controller programs its internal circuitry accordingly so that it operates consistently with the received policy attribute.

Thus, various embodiments of a data processing system with a hierarchical memory controller have been described. Many of the features of these embodiments can be used by themselves or combined with other such features in various combinations. According to some embodiments, the hierarchical memory controller includes a leader memory controller associated with a data processor or data processing node, and a follower memory controller associated with a near-memory controller or processor-in-memory of a memory stack, memory cube, or the like. The division of functions allows a hierarchy of control in which higher-level scheduling decisions can be made in the leader memory controller, and more memory-specific decisions can be made in the follower memory controller. The division of memory controller functions facilitates advanced packaging options like stacking of the memory stack or memory cube directly on the processor die or adjacent to the processor die.

While particular embodiments have been described, various modifications to these embodiments will be apparent to those skilled in the art. For example, the disclosed techniques can be used in a variety of different data processing systems with one or more CPU cores, one or more GPU cores, one or more digital signal processor cores, one or more neural network cores, and the like. The system can be implemented with a variety of conventional and advanced memory types including, for example, double data rate (DDR) memory, graphics double-data rate (GDDR) memory, high bandwidth memory (HBM), ferro-electric random access memory (FeRAM), spin-torque transfer memory, magneto-resistive random access memory (MRAM), non-volatile memory, and other types of memory. In a system using the disclosed hierarchical memory controller with advanced packaging techniques, the controller die with the follower memory controller could be mounted on or adjacent to the processor die, and the memory stack could be mounted on the controller die, but in other implementations the stacking order of the components could be changed. While certain memory controller functions were associated with the leader memory controller and other functions associated with the follower memory controller, some functions such as refresh and sequencing into and out of low power states can be variously associated with either the leader memory controller or the follower memory controller.

Accordingly, it is intended by the appended claims to cover all modifications of the disclosed embodiments that fall within the scope of the disclosed embodiments.

What is claimed is:

1. An electronic device, comprising:
   a processor having processor circuitry and a leader memory controller;
   a controller coupled to the processor and having a follower memory controller; and
   a memory,
   wherein the processor circuitry is operable to generate memory access requests to the leader memory controller, and the leader memory controller is operable to schedule an order of the memory access requests, wherein the leader memory controller is operable to provide a sequence of the memory access requests in the order to the follower memory controller, and the follower memory controller is operable to issue the sequence of the memory access requests to the memory.

2. The electronic device of claim 1, wherein:
   the processor is implemented on a processor die;
   the controller is implemented on a controller die; and
   the memory is implemented on at least one memory die.

3. The electronic device of claim 2, wherein:
   the processor die comprises a first major surface and a second major surface; and
   the controller die comprises a first major surface and a second major surface by which the controller die is mounted on the first major surface of the processor die and the follower memory controller is electrically coupled to the leader memory controller; and
   the at least one memory die is mounted on the first major surface of the controller die and each of the at least one memory die is electrically coupled to the follower memory controller.

4. The electronic device of claim 3, wherein:
   the at least one memory die comprises one of: at least one stacked dynamic random access memory (DRAM) die, at least one embedded DRAM die, at least one ferro-electric random access memory (FeRAM) die, at least one spin-torque transfer memory die, at least one magneto-resistive memory die, and at least one phase-change memory die.

5. The electronic device of claim 1, wherein:
   wherein the leader memory controller and the follower memory controller together issue commands received by the leader memory controller to the memory in an order different from an order provided by the processor circuitry based on a plurality of predetermined criteria.

6. The electronic device of claim 5, wherein:
   the plurality of predetermined criteria includes a respective quality-of-service indicator, and the leader memory controller sends the respective quality-of-service indicator with each memory access request to the follower memory controller.

7. The electronic device of claim 5, wherein the leader memory controller comprises:
   a command queue for storing memory access requests;
   a page table for storing a current page state of memory pages in the memory; and
   a picker for selecting entries from the command queue based on the plurality of predetermined criteria and providing selected entries with a corresponding page state from the page table to the follower memory controller.

8. The electronic device of claim 7, wherein:
   the follower memory controller issues row commands selectively in response to the current page state of a corresponding memory page provided by the leader memory controller.

9. The electronic device of claim 1, wherein:
   the leader memory controller and the follower memory controller are optically connected.

10. The electronic device of claim 1, wherein the follower memory controller comprises:
    a first follower memory controller having a first command queue for storing memory access requests from the leader memory controller to a first pseudo-channel of the memory; and
    a second follower memory controller having a second command queue for storing memory access requests from the leader memory controller to a second pseudo-channel of the memory.

11. The electronic device of claim 1, wherein:
    each of the leader memory controller and the follower memory controller have a respective page table;
    the follower memory controller arbitrates between memory access requests and refresh requests;
    the follower memory controller selectively provides an updated page status to the leader memory controller; and
    the leader memory controller updates its respective page table in response to the updated page status.

12. The electronic device of claim 1, wherein:
    the processor is operable to program a respective scheduling policy of at least one of the leader memory controller and the follower memory controller.

13. An electronic device comprising a semiconductor die having a first major surface and a second major surface, the semiconductor die comprising:
    a processor region having a first side and a second side and comprising a leader memory controller;
    a controller region having a first surface forming part of the first major surface, a second surface forming part of the second major surface, a first side adjacent to the second side of the processor region, and a second side, wherein the controller region comprises a follower memory controller that is electrically coupled to the leader memory controller; and
    a memory region having a first surface forming part of the first major surface, a second surface forming part of the second major surface, a first side adjacent to the second side of the controller region, and a second side, wherein the memory region is electrically coupled to the controller region.

14. The electronic device of claim 13, wherein the memory region comprises one of: a ferro-electric random access memory (FeRAM), a spin-torque transfer memory, a magneto-resistive memory, and a phase-change memory.

15. The electronic device of claim 13, wherein:
    the leader memory controller and the follower memory controller together issue commands received by the leader memory controller to the memory region in an order different from an order provided by the processor region based on a plurality of predetermined criteria.

16. The electronic device of claim 15, wherein the leader memory controller comprises:
    a command queue for storing memory access requests;

a page table for storing current page states of memory pages in the memory region; and a picker for selecting entries from the command queue based on the plurality of predetermined criteria and providing selected entries with a corresponding page state from the page table to the follower memory controller.

17. A method for operating an electronic device, comprising:

processing data and generating memory access requests in response thereto;

scheduling an order of the memory access requests using a leader memory controller;

providing a sequence of the memory access requests in the order to a follower memory controller; and issuing the sequence of memory access requests to a memory by the follower memory controller.

18. The method of claim 17, wherein scheduling the order of the memory access requests using the leader memory controller comprises:

storing the memory access requests in a command queue of the leader memory controller;

picking selected memory access requests from the command queue by the leader memory controller based on a plurality of predetermined criteria; and issuing memory commands by the follower memory controller to the memory in response to the picking.

19. The method of claim 18, wherein the method further comprises:

storing current page states of memory pages in the memory by the leader memory controller;

providing the current page states of corresponding memory pages picked by the leader memory controller to the follower memory controller; and issuing the memory commands to the memory according to the current page states, the issuing comprising issuing row commands selectively in response to the current page state of a corresponding memory page provided by the leader memory controller.

20. The method of claim 17, wherein issuing the memory access requests to the memory by the follower memory controller comprises:

issuing the memory access requests to the memory by the follower memory controller without changing the order.

21. The method of claim 17, wherein issuing the memory access requests to the memory by the follower memory controller to the memory comprises:

selectively changing the order by the follower memory controller in response to refresh requirements of the memory.

22. The method of claim 21, wherein issuing the memory access requests to the memory by the follower memory controller to the memory further comprises:

providing an updated page status to the leader memory controller if the follower memory controller selectively changes the order; and updating a respective page table of the leader memory controller in response to the updated page status.

23. The method of claim 17, wherein the method further comprises:

processing data and generating memory access requests in response thereto in response to an application program; and wherein the method further comprises selectively programming a respective scheduling policy of at least one of the leader memory controller and the follower memory controller in response to the application program.

* * * * *